US006424958B1

United States Patent
Pappalardo et al.

(10) Patent No.: US 6,424,958 B1
(45) Date of Patent: Jul. 23, 2002

(54) CODING AND STORING METHOD FOR FUZZY LOGIC RULES AND CIRCUIT ARCHITECTURE FOR PROCESSING SUCH RULES

(75) Inventors: Francesco Pappalardo, Paterno'; Liliana Arcidiacono, Tremestieri Etneo; Biagio Giacalone, Trapani; Dario Di Bella, Nicolosi, all of (IT)

(73) Assignee: SGS-Thomson Microelectronics S.r.l., Agrate Brianza (IT)

( * ) Notice: Subject to any disclaimer, the term of this patent is extended or adjusted under 35 U.S.C. 154(b) by 0 days.

(21) Appl. No.: 08/995,671

(22) Filed: Dec. 22, 1997

(30) Foreign Application Priority Data

Dec. 27, 1996 (EP) .............................................. 96830656

(51) Int. Cl.⁷ .............................. G06G 7/00; G06F 9/44
(52) U.S. Cl. .............................................. 706/8; 706/52
(58) Field of Search ........................................ 706/8, 52

(56) References Cited

U.S. PATENT DOCUMENTS

| | | | | |
|---|---|---|---|---|
| 5,165,011 A | * | 11/1992 | Hisano ........................... | 706/50 |
| 5,193,144 A | * | 3/1993 | Tsutsumi et al. .............. | 706/60 |
| 5,249,258 A | * | 9/1993 | Hisano ........................... | 706/1 |
| 5,263,125 A | | 11/1993 | Viot et al. ...................... | 395/51 |
| 5,398,299 A | * | 3/1995 | Ota et al. ....................... | 706/8 |
| 5,410,633 A | * | 4/1995 | Ota et al. ....................... | 706/7 |
| 5,440,672 A | * | 8/1995 | Araki et al. ................... | 706/52 |
| 5,537,514 A | * | 7/1996 | Nishidai ......................... | 706/52 |
| 5,559,928 A | * | 9/1996 | Ota et al. ....................... | 706/8 |
| 5,561,738 A | * | 10/1996 | Kinerk et al. .................. | 706/4 |
| 5,604,842 A | * | 2/1997 | Nishidai ......................... | 706/52 |
| 5,724,483 A | * | 3/1998 | Gianguido et al. ............ | 706/8 |
| 5,764,854 A | * | 6/1998 | Ota et al. ....................... | 706/8 |

FOREIGN PATENT DOCUMENTS

EP      0 538 470      4/1993      ............. G06F/9/44

OTHER PUBLICATIONS

Yeung Et Al, "A Weighted Fuzzy Production Rule Evaluation Method", IEEE Proceedings of the International Joint Conference on Fuzzy Systems and Fuzzy Engineering Symposium, Mar. 1995.*

Nitta Et Al,"A High Performance Fuzzy Inference Processor. and its Evaluation System", IEEE Proceedings of the International Joint Conference on Fuzzy Systems and Fuzzy Engineering Symposium, Mar. 1995.*

"Design of a VLSI Very High Speed Reconfigurable Digital Fuzzy Processor"; Alessandro Gabrielli; ACM, 1995.*

"A 12b General–Purpose Fuzzy Logic Controller Chip"; Herbert Eichfeld et al.; IEEE, 1996.*

"VLSI Fuzzy Chip and Inference Accelerator Board Systems"; Hiroyuki Watanabe et al.; IEEE, 1991.*

European Search Report from European Application No. 96830656.

Index: An Expert System Shell for the Real–Time Command of Industrial Processes, G. Libert, Journal A. vol. 30, No. 4, Dec. 1, 1989, pp. 37–46.

* cited by examiner

Primary Examiner—George B. Davis
(74) Attorney, Agent, or Firm—Wolf, Greenfield & Sacks, P.C.; James H. Morris

(57) ABSTRACT

The invention relates to a method of coding and storing fuzzy logic rules, and to a circuit architecture for processing such rules. The method provides for at least one inference rule of the IF/THEN type, having a predetermined number of antecedent parts of fuzzy variables and at least one consequent part, to be dismembered and stored into memory words to allow subsequent processing using logic operators of the AND/OR/NOT type. The coding of rules and variables is effected sequentially. Thus, the occupation of memory locations can be minimized. Specifically, the rules are coded through a multi-word description, such that the number of words coding each rule is a varying number dependent on the number of antecedent parts in the rule.

21 Claims, 7 Drawing Sheets

| 1 bit | 1 bit | m bit | n bit | 1 bit |
|---|---|---|---|---|
| RET | OP | M_INPUT | N_MBFs | POL |

| ret | op | m_input is n_mbf | pol | |
|---|---|---|---|---|
| 1 | 1 | A | 1 | } if A and |
| 1 | 0 | B | 1 | } B then |
| Z | | | | } Z |

| ret | op | m_input is n_mbf | pol | |
|---|---|---|---|---|
| 1 | 0/1 | A | 1 | } if A or/and |
| 1 | 0 | A | 1 | } A then |
| Z | | | | } Z |

| ret | op | m_input is n_mbf | pol | |
|---|---|---|---|---|
| 1 | 1 | A | 0 | } if not A and |
| 0 | 0 | B | 1 | } B or |
| 1 | 0 | C | 1 | } C then |
| Z | | | | } Z |

FIG. 4

| ret | op | m_input is n_mbf | pol | |
|---|---|---|---|---|
| 0 | 0 | A | 1 | } if (A or |
| 1 | 1 | B | 0 | } not B) and |
| 1 | 0 | C | 0 | } (not C or |
| 1 | 0 | D | 1 | } D) then |
| Z | | | | } Z |

FIG. 5

| ret | op | m_input is n_mbf | pol | |
|---|---|---|---|---|
| 1 | 1 | A | 0 | } if not A and |
| 0 | 0 | B | 1 | } B or |
| 1 | 0 | C | 1 | } C then |
| $Z_1$ | | | | } $Z_1$ |
| 1 | 1 | A | 1 | } if A and |
| 1 | 1 | B | 1 | } B then |
| $Z_2$ | | | | } $Z_2$ |
| OUTPUT NUMBER | | | | |

FIG. 6

| ret | op | m_input is n_mbf | pol | |
|---|---|---|---|---|
| 2 → 0 | 0 | A | 1 | } if (A or |
| 3 → 0 | 1 | B | 1 | } B and |
| 5 → 1 | 0 | C | 1 | } C) or |
| 6 → 1 | 1 | D | 1 | } (D and |
| 7 → 1 | 0 | E | 0 | } not E) then |
| 4 → | | Z | | } Z |

FIG. 7

| ret | op | m_input is n_mbf | pol | |
|---|---|---|---|---|
| 2 → 0 | 0 | A | 1 | } if (A or |
| 3 → 0 | 1 | B | 1 | } B and |
| 5 → 1 | 0 | C | 1 | } C) or |
| 6 → 0 | 1 | D | 1 | } (D and |
| 7 → 1 | 1 | E | 1 | } E) and |
| 8 → 1 | 1 | F | 1 | } (F and |
| 9 → 1 | 0 | G | 1 | } G) then |
| 4 → | | Z | | } Z |

FIG. 8

|   | 7 | 6 | 5 | ..... | | | 0 |
|---|---|---|---|---|---|---|---|
| 13 | − | − | − | − | − | 1 | 1 | 0 |
| 2 | 1 | 1 | A | | | | |
| 3 | 0 | 0 | B | | | | |
| 5 | 1 | 0 | C | | | | |
| 4 | Z | | | | | | |

*FIG. 11*

| 1 bit | 1 bit | 3 bit | 3 bit |
|---|---|---|---|
| RET | OP | M_INPUT | N_MBFs |

*FIG. 12*

CODING AND STORING METHOD FOR FUZZY LOGIC RULES AND CIRCUIT ARCHITECTURE FOR PROCESSING SUCH RULES

BACKGROUND OF THE INVENTION

1. Field of the Invention

This invention relates to a method of coding and storing fuzzy logic rules, and to a circuit architecture for processing such rules.

Specifically but not exclusively, the invention relates to a method of coding and storing fuzzy logic rules, wherein at least one inference rule of the IF/THEN type having a predetermined number of antecedent parts of the fuzzy variables, and at least one consequent part, is dismembered and stored into memory words for allowing subsequent processing with logic operators of the AND/OR/NOT type.

2. Discussion of the Related Art

As is well known, the structure of a fuzzy logic rule, or instruction, can be schematically expressed by the following relationship: IF condition THEN action, where the rule portion designated "condition" is also called the antecedent part, and "action" is called the consequent part.

An example of a fuzzy logic rule coding is disclosed in European Patent No. 0 544 629 to this Applicant.

As a further example, the following fuzzy rule can be considered which comprises two logic operations of the AND/OR type having two levels of priority:

IF (ing1 is mf3 or ing is not mf0) and (ing2 is not mf8 and ing0 is mf15) THEN consequent. (1)

In fuzzy logic-based architectures, an evaluation block is provided which is referred to as the "omega" operator and is to determine the so-called "ω" weight related to the antecedent part of the fuzzy rules.

In essence, the weight $\omega_i$ of the i-th rule is an indicator of the i-th action $Z_i$ to be effected, and contributes in the determination of the output value of the architecture.

For example, in the known Centroid Method, the contribution from the various "ω" weights is given as:

$$\frac{\Sigma \omega_i * Zi}{\Sigma \omega_i} \quad (2)$$

The state of the art currently proposes coding and processing fuzzy variables in parallel, but processing the pertinent fuzzy rules in a serial mode.

This solution has been adopted to produce fuzzy processors known by their trade designations W.A.R.P. 1.x and W.A.R.P. 2.0, but still shows some shortcomings, as outlined herein below.

A second prior solution proposes, on the other hand, coding and processing the fuzzy rules in parallel, but processing the respective variables in a serial mode. That is to say, the fuzzy inference rule is fully contained within one memory word. A method of this kind is that disclosed, for example, in the aforementioned European Patent No. 0 544 629 to this Applicant.

Both of these solutions have shortcomings, such as a requirement for memories having words with different lengths for different fuzzy processors. Additionally, this involves the need for memories with very long words.

Furthermore, with the fuzzy inference rule stored in a single memory word, a constraint is imposed on the number of antecedent parts, which can only be a fixed number. This results in a waste of memory locations when the inference rules have a smaller number of antecedent parts, the storing of which requires a smaller number of bits.

The underlying technical problem addressed by the present invention is the problem of providing a new methodology for coding and processing fuzzy logic inference rules, which can minimize the memory area requirements of rule coding, while affording reduced complexity of the electronic decoding circuits associated with that memory area.

The achievement of this would enable the current limitations and shortcomings to be overcome as are besetting the prior art solutions to the problem of coding and processing fuzzy logic rules.

SUMMARY OF THE INVENTION

The present invention provides a serial coding of the fuzzy rules followed by a corresponding serial processing of both the rules and the variables. In this way, the occupation of memory locations can be minimized.

Specifically, the rules are coded by a multi-word description whereby the number of words used to code each rule is a varying number tied to the number of antecedent parts in the rule.

According to one embodiment of the invention, a method of coding and storing fuzzy logic rules is disclosed, wherein at least one inference rule of the IF/THEN type having a predetermined number of antecedent parts of fuzzy variables and at least one consequent part are dismembered and stored into memory words to allow subsequent processing using logic operators of the AND/OR/NOT type, wherein the rules and variables are coded serially. Each rule is coded with a first type of memory word for each antecedent part, a second type of memory word for each consequent part and a third type of memory word if the set of rules relate to more than one output variable and the coded inference operation is the last to carry weight in the computation of the fuzzy output.

According to another embodiment of the invention, a circuit architecture for coding and storing fuzzy logic rules is disclosed, wherein at least one inference rule of the IF/THEN type having a predetermined number of antecedent parts of fuzzy variables and at least one consequent part are dismembered and stored into memory words to allow subsequent processing using logic operators of the AND/OR/NOT type. The architecture comprises a fuzzy processor connected bi-directionally to a memory where the coding of the rules and the variables is effected sequentially. The architecture further comprises a processing circuit portion for computing the alpha weight of an antecedent part of a fuzzy rule and an evaluation circuit block for computing and outputting an omega weight related to the antecedent part of the fuzzy rules, and a circuit portion provided downstream from the evaluation circuit block to process the various omega weights output by the evaluation circuit block, and outputting a fuzzy output, the circuit portion processing the omega wieghts using the Centroid Method.

According to another embodiment of the invention, a method of coding and processing a fuzzy logic rule is disclosed. The fuzzy logic rule comprises at least one antecedent part and at least one consequent part and the method comprises the steps of storing each of the at least one antecedent parts in a separate first memory byte, storing each of the at least one consequent parts in a separate second memory byte and serially processing each of the at least one antecedent parts and each of the at least one consequent parts. The method further comprises storing, in a first field of each of the first memory bytes, information which indicates a priority of order followed in the processing step, storing, in a second field of each of the first memory bytes, information which indicates a logic operation to be performed, storing, in a third field of each of the first memory bytes, an input variable on which the logic operation is performed and storing, in a fourth field of each of the first memory bytes, a membership function which determines a weighting factor for each antecedent part.

The method further comprises storing, in a fifth field of each of the first memory bytes, information which indicates whether a NOT operator is to be applied to the input variable stored in the third field of each memory byte and storing, in the second field of a final antecedent part of the fuzzy logic rule, information which indicates the presence or absence of further rules to be processed in the processing step.

According to yet another embodiment of the invention, a device for coding and processing fuzzy logic rules is disclosed. Each of the fuzzy logic rules comprises at least one antecedent, each antecedent having at least one antecedent part and a corresponding consequent, $Z_i$, each consequent $Z_i$ having at least one consequent part, each of the at least one antecedent part and the at least one consequent part comprising a memory word. The device comprises memory means for storing a plurality of the memory words, alpha value computing means for computing an alpha value for each of the at least one antecedent parts and omega value computing means for receiving the alpha value from the alpha value computing means and computing an omega value, $\omega_i$, for each antecedent of each fuzzy logic rule. The device further comprises processing means for receiving the omega value $\omega_i$ and the consequent $Z_i$ and outputting a fuzzy output after processing the omega value and consequent according to the equation:

$$\frac{\Sigma \omega_i * Z_i}{\Sigma \omega_i} \text{ and} \tag{2}$$

control means for supplying the memory words from the memory means to the alpha value computing means, for supplying the consequent $Z_i$ from the memory means to the processing means and for controlling the operation of the alpha value computing means, the omega value computing means and the processing means.

The features and advantages of the method and architecture according to the invention will be apparent from the following description of an embodiment thereof, given by way of non-limitative example in relation to the accompanying drawings.

BRIEF DESCRIPTION OF THE DRAWINGS

FIG. 1 is a schematic representation of a memory word, as divided into fields according to the method of the present invention;

FIGS. 2–8 are respective schematic representations of memory word sequences, as required for coding different types of fuzzy rules, according to the method of the present invention;

FIGS. 11 and 12 are respective schematic representations of memory words, as divided according to a specific embodiment.

DETAILED DESCRIPTION

Figures 1, 2, 3:
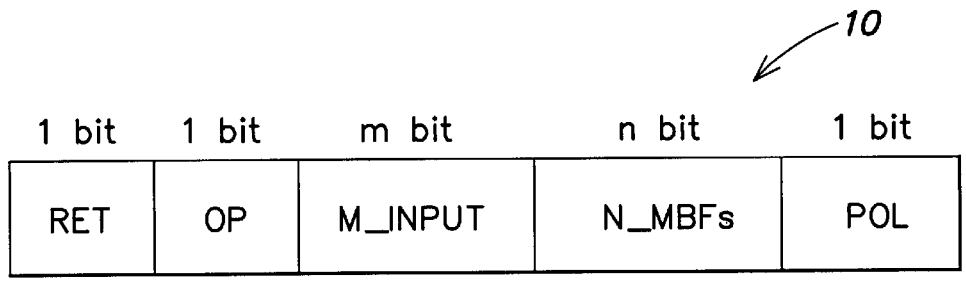

Referring to the drawing figures, specifically to the example of FIG. 1, generally and schematically indicated at 10 is a memory word comprising a number of fields, to be explained in detail below.

A clearer view of the invention aspects can be gained by first considering a fuzzy inference rule and the manner of coding the rule.

A fuzzy rule will be assumed which includes two logic operations of the AND/OR type and two priority levels in such operations, as follows:

IF (ing1 is mf3 or ing is not mf0) and (ing2 is not mf8 and ing0 is mf15) THEN consequent. (1)

According to the method of this invention, this rule would be coded with a memory word "word_ant" for each antecedent part, a memory word "word_cons" for each consequent part; this word may either contain a constant or "crisp" value or a fuzzy value, and in the latter instance, it would be coded with information for computing the consequent part, similar to what has been coded in "word_ant" and a memory word "word_num_out" if the set of rules relating to more than one output variable, and the coded inference operation is the last to carry weight in the computation of the fuzzy output. In this way, the largest number of outputs can be $2^n$, with n being equal to the number of bits in the word.

In accordance with the present invention, each rule is constructed from a sequential reading of certain memory words. Thus, rule (1) above would be coded with four words "word_ant", one word "word_cons", and one word "word_num_out".

The composition of each memory word will now be discussed in greater detail, with reference in particular to the example of FIG. 1, beginning with the word "word_ant" for the antecedent parts.

A first field, denoted by the RET acronym, defines the rule structure. Preferably, this field comprises one bit. In dependence on the value of the first field RET, the rule would have the following structure:

If A op B op C . . . Then Z; (3)

wherein no priority exists as would be commanded by the presence of brackets. Alternatively, the rule structure could be as follows:

If (A op B) op (C op D op E . . . )op . . . Then Z; (4)

wherein the presence of brackets commands predetermined processing priorities. The bit of the field RET communicates the opening or closing of the brackets, and is also used to indicate the memory word which is related to the consequent part.

A second field, denoted by the OP acronym, represents the type of the fuzzy operator, either AND or OR. Preferably, this field comprises a single bit.

In the memory word related to the last antecedent part, the field OP takes a different meaning, and tells whether there are more rules to determine the fuzzy output or if the rule being processed is the last rule, or in a specific case, the only rule.

A third field, denoted by the $M_{13}$ INPUT acronym, comprises m bits, i.e. as many bits as there are input variables. This field M_INPUT indicates the input variable whose value is to be intersected by the membership function indicated in the next field, so that an "alpha" weight can be determined for the antecedent part being processed.

A fourth field N_MBFs indicates the membership function to be used in computing the "alpha" weight. This fourth field comprises n bits which correspond to the number of membership functions that can be defined for each input variable.

A fifth field POL, comprising a single bit, represents the third operator in fuzzy logics, NOT. The possibility of indicating presence or absence of the NOT operator affords a complete set of operators.

Some exemplary codings/processings by the method of this invention can be illustrated with the aid of FIGS. 2 through 8.

Assume the following coding stipulations: RET=0— meaning that a rule of type (2) is to be processed; OP=0—identifying the OR operator; and POL=1— indicating the natural (i.e. non-negated) "alpha" value.

Of course, different stipulations could be made.

Referring to FIG. 2, it can be appreciated that a rule of the type of "If A and B Then Z", having two antecedent parts, may be coded with one memory word for each antecedent part, and one memory word for the consequent part, giving a total of as few as three memory words, indicated in FIG. 2 by the numerals 2, 3 and 4.

The first word 2 comprises a field RET having a logic value of 1 which provides for the sequential processing of the fuzzy rule. The second field OP, having a logic value of 1, indicates that the first antecedent part A is linked to the second antecedent part by an AND operator.

In the second word 3, the field RET has a logic value of 1 because there are only two antecedent parts in the rule, and accordingly, the next memory word will be that related to the consequent part.

On rare occasions, fuzzy rules may have to be processed which have just one antecedent part. In this case, the fuzzy rule coding with two operands would be used, and the antecedent part repeated. For example, the rule "If A Then Z" should be written as follows: if A or/and A, Then Z, which is always coded with three memory words, as shown in FIG. 3.

A rule having three antecedent parts will now be considered, such as: if not A and B or C, Then Z. FIG. 4 illustrates the possibility in the present invention of coding with no more than four memory words.

In the first word 2, the field RET=1 provides for the sequential processing of the fuzzy rule.

The second field OP, having a logic value of 1, indicates that the first two antecedent parts A and B are linked by an AND operator. In the second word 3, the field RET has a logic value of 0, since the antecedent parts are more than two in the rule. A third memory word 5 is associated with the last antecedent part C and comprises a field RET=1. The next memory word 4 is related to the consequent part Z.

An example with four antecedent parts, as shown in FIG. 5, will now be considered.

A rule of the following type: if (A or not B) and (not C or D) then Z is coded with five memory words, as shown in FIG. 5. The field RET=0 in the first word 2 indicates that the rule includes several bracketed pairs, and therefore, the operations in brackets should be processed in priority. In the second word 3, the field RET has a logic value of 1 to indicate the closing of the first partial operation "A or not B", which should then be stored into a temporary register denoted by 11 in FIG. 10. An AND operator is associated with this temporary value as indicated by the second field OP with a logic value of 1 in the same word 3.

The third memory word 5 is associated with the third antecedent part C and comprises a field RET=1 and a field OP=0 for coding the operation "not C or". The result of the partial inference operation "not C or D" requires an additional register 12 of FIG. 10, for storing the value to be compared with the contents of the previous register 11.

A fourth memory word 6 is associated with the last antecedent part D and comprises a field RET=1. The field OP=0 indicates that the output Z does not enter the computation.

In fact, the next memory word 4 relates to the consequent part Z, involving here a computation of the various weights $\omega_i$ of the i-th rule, and is an indicator of the i-th action $Z_i$ to be effected in order to determine the output value.

A further example will now be considered wherein the output is determined by processing a rule with three antecedent parts and one consequent part, and a second rule with two antecedent parts and one consequent part.

Schematically represented in FIG. 6 is the number of memory words required for determining this output. The first rule [If not A and B or C Then Z1] is coded with four memory words, as in FIG. 4, and the second rule [If A and B Then Z2] is coded with three memory words, as in FIG. 2. One word is necessary for the output Z, giving a total of eight memory words.

It is interesting to observe that the field OP=0 in the third word 5 related to the first rule is indicating that a second rule should be processed, while the field OP=1 in the second word 3 related to the second rule is indicating the need for processing a final computation to obtain a fuzzy output as indicated by the eighth word 4.

Other examples may be given, with larger numbers of antecedent parts in one rule, and increased complexity of the operations between parts.

For example, a rule with five antecedent parts "If (A or B and C) or (D and not E) Then Z" would be coded with six memory words, as highlighted by FIG. 7. The field RET=0 in the first word 2 is indicating presence of several bracketed pairs. The field RET=0 in the second word 3 is indicating presence of two or more antecedent parts in the computation of the first partial value [A or B and C], since the bracket is yet to be closed. The field OP=0 in the third word 5 implies that the previous partial value should be subjected to an OR operation with the partial result of a following inference operation [D and not E]. The field RET=1 in the fourth word 6 is indicating that we are now at the last bracket.

A last coding example is illustrated in FIG. 8, where the sequence of memory words is schematized which, in accordance with the invention, is necessary for coding a rule having seven antecedent parts, of the following type:

If (A or B and C) or (D and not E) and (F and G) then Z.

The field RET=0 in the first word 2 is indicating presence of several bracketed pairs. The field RET=0 in the second word 3 is indicating presence of two or more antecedent parts which contribute in the computation of the first partial value [A or B and C]. The last antecedent part C is identified by the field RET=1 in the third word 5.

The field OP=0 in the third word 5 implies that the previous partial value should be subjected to an OR operation with the partial result of a following inference operation [D and not E]. The second partial value is defined by the field RET=0 in the fourth word 6 indicating a second and non-last bracket level, and by the field RET=1 in a fifth word 7. The result of the OR operation is stored into the two registers 11 and 12, and held within register 11.

The field OP=1 in the fifth word 7 indicates that that value should be subjected to an AND operation with a partial value enclosed within the last brackets [F and G]. The last-mentioned partial value is determined by the last two words 8 and 9, and stored into register 12. The value of the field RET=1 in the sixth word 8 is indicating that we are now at the last bracket level.

As can be appreciated from this excursive discussion of various examples, the method of this invention allows a varying format to be used for coding each fuzzy rule. In other words, the coding of each rule is made possible with a number of memory words that varies according to the rule type. This enables serial processing of the rules and their variables, to provide enhanced flexibility and significant savings in the memory area occupied.

This serial processing is schematized in the flow diagram of FIG. 9, which illustrates the various steps of processing and computing the weights, "alpha" and $\omega_i$, and storing them into the registers 11 and 12 whose contents correspond to the values M and k in this figure. Such advantageous features bring about additional benefits in terms of reduction and optimization of the electronic circuitry for decoding the memory areas intended to store the fuzzy rules.

Figure 10:
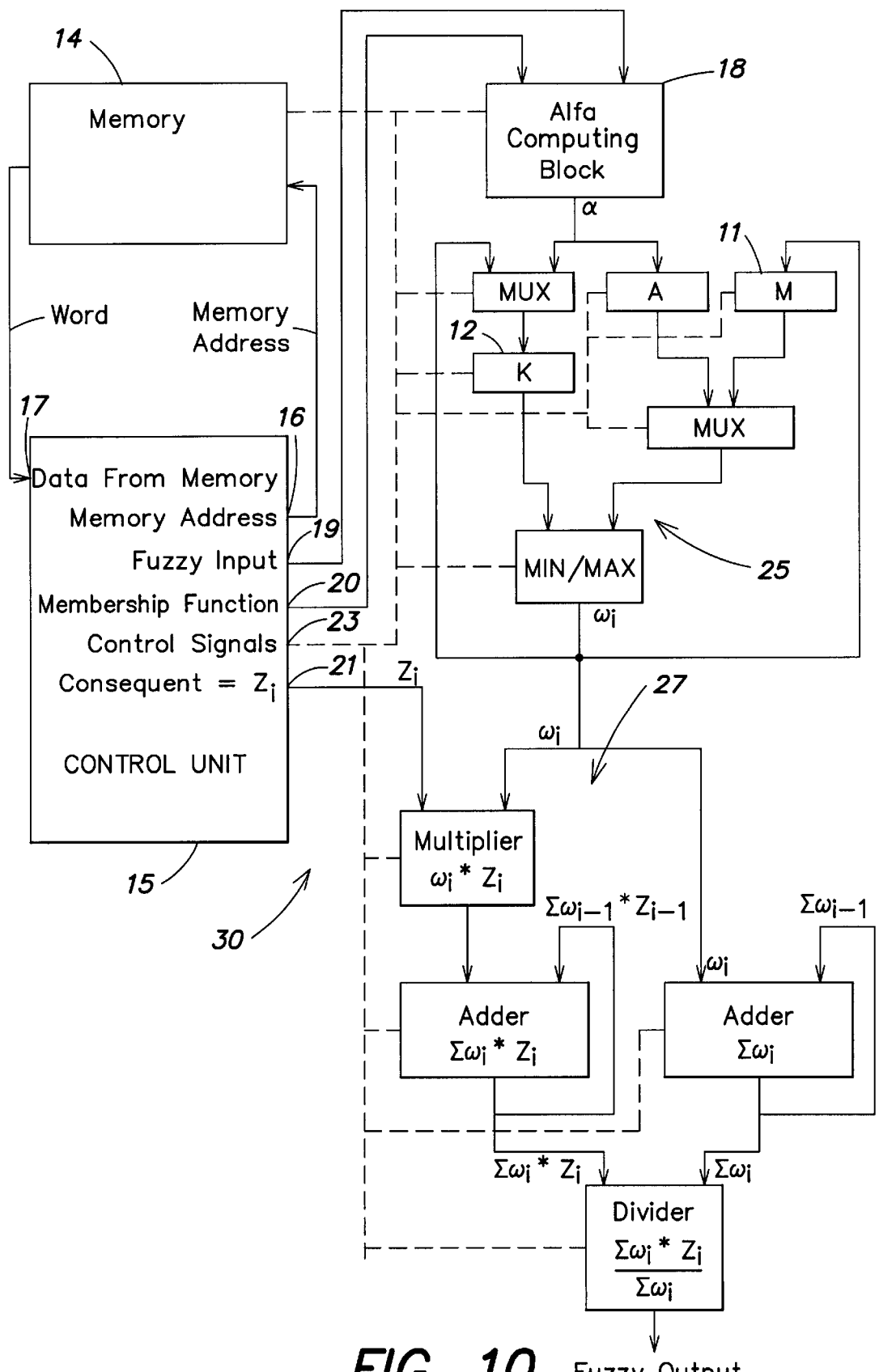
FIG. 10 is a schematic view of a circuit architecture provided in the present invention for coding and processing fuzzy logic rules.

In this regard, a circuit architecture 30 implementing the inventive method will now be described with particular reference to FIG. 10. An electronic processor 15 is associated with this architecture 30 for the purpose of integrating the fuzzy logic control to the processing of arithmetic/logic operations as are typical of conventional processors.

The processor 15 is designed to process four input variables and sixteen membership functions. To this aim, two bits are required for defining the number of inputs, and four bits for defining the number of membership functions associated therewith. Accordingly, with memory words of eight bits, two bits are available for defining the first RET, second OP, and fifth POL fields described hereinabove. The fields RET and OP are vital to the proper operability of the device in accordance with the present invention.

The field POL, which defines the "polarity" of a given antecedent part, is provided through the use of a dedicated memory word. Therefore, eight bits have been defined which correspond in the same order to the polarities of eight antecedent parts of a fuzzy rule.

Thus, a constraint has been imposed on the use of rules having more than eight antecedent parts. However, this is not a strict constraint, and could be removed by, for example, assigning several polarity bytes to the start of each rule coding sequence.

In essence, an initial byte 13, FIG. 11, has been selected for the processor 15 whose bits represent the polarities of eight possible antecedent "alpha" parts. This arrangement is shown in FIG. 11, which is virtually a duplicate of FIG. 2 but for the distinction of the initial byte 13.

The following bytes 2, 3 and 5 provide for the two most significant bits to correspond to the previously described fields REL and OP. In particular, the eighth bit REL defines the rule type, and the seventh bit OP defines the fuzzy operator.

The remaining six bits of each byte define the address of the membership function, namely: the sixth to fourth bits define one of the four inputs, as provided for by the third field M_INPUT; and the last three bits define one of the sixteen membership functions associated with the corresponding input, as provided for by the fourth field N_MBFs.

FIG. 12 illustrates schematically this division of the memory word into its various fields as provided by the invention. Of course, for coding the consequent part Z, there would be a one-byte memory word 4 for each rule.

The processor 15 is connected bi-directionally to a memory 14 having eight-bit memory words. The processor 15 will select, on an output 16, a memory address from where information is to be retrieved, and receive, to an input 17, the data contained at that memory location.

The processor 15 is also in communication with a processing circuit portion 18 intended for computing the inherent "alpha" value to an antecedent part of a fuzzy rule. For this purpose, the processor 15 will supply the values of the input variable and its membership function to this portion 18 through own outputs 19 and 20.

The "alpha" value is used in an evaluation circuit block 25, referred to as the "omega" operator, to compute the so-called ω weight related to the antecedent part of the fuzzy rules. The block 25 also includes the registers 11 and 12. The weight $\omega_i$ of the i-th rule is an indicator of the i-th action $Z_i$ to be effected, and contributes in the determination of the output Z value of the architecture 30.

A circuit portion 27 is provided downstream from the block 25 to process the contributions from the various ω weights by the known Centroid Method, according to the following formula:

$$\frac{\Sigma \omega_i * Z_i}{\Sigma \omega_i} \qquad (2)$$

The value $Z_i$ is supplied by an output 21 from the processor 15, and the weight $\omega_i$ of the i-th rule is the outcome of the processing at block 25.

Control signals are directed by the processor 15 to all the components of the architecture 30 through an output 23.

From the foregoing, the skilled person in the art will appreciate that, with the method and the architecture according to the invention, memories 14 having a standard word length, e.g. of one byte, can be used, thereby enabling memories to be also utilized which were originally designed for processors of different types.

Thus, the method of this invention does solve the technical problem, and provides a number of advantages, foremost among which is the fact that the length of each memory word is tied to the number of input variables and the number of membership functions associated with each variable. Further, the information for computing the antecedent part of each rule is contained within a number of words equal to the number of antecedent parts. Briefly stated, the number of words used for coding each rule is a varying number, and is in fact tied to the number of antecedent parts of the inference rule.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A method of storing fuzzy logic rules, wherein at least one inference rule of the IF/THEN type having a predetermined number of antecedent parts of fuzzy variables and at least one consequent part are dismembered into separate antecedent parts and consequent parts, each part stored in an individual memory word to allow for subsequent processing using logic operators of the AND/OR/NOT type, wherein the memory words of an inference rule are stored sequentially in an order corresponding to a structure of the IF/THEN type inference rule, and the at least one inference rule is stored sequentially.

2. A method of coding and storing fuzzy logic rules, wherein at least one inference rule of the IF/THEN type having a predetermined number of antecedent parts of fuzzy variables and at least one consequent part are dismembered into separate antecedent parts and consequent parts, each part being stored in an individual memory word to allow for subsequent processing using logic operators of the AND/OR/NOT type, wherein the variables are coded for serial processing and stored sequentially in an order corresponding to a structure of the IF/THEN type inference rule, wherein each rule is coded with:

a first type of memory word composition for each antecedent part;

a second type of memory word composition for each consequent part; and a third type of memory word composition if the set of fuzzy logic rules relate to more than one output variable and a coded inference operation is the last to carry weight in the computation of a fuzzy output.

3. A method according to claim 2, wherein each first type of memory word is composed of a plurality of fields.

4. A method according to claim 3, wherein said plurality of fields include a first field defining a rule structure, a second field representing a type of the fuzzy operator, a third field indicating an input variable whose value is to intersect a membership function indicated in a following fourth field such that an alpha weight can be determined for a antecedent part being processed.

5. A method according to claim 4, wherein first and second fields each occupy a single bit of said first type of memory word.

6. A method according to claim 4, wherein the third field comprises m bits, m is a being the same as the number of input variables.

7. A method according to claim 4, wherein the fourth field comprises n bits which correspond to a number of membership functions definable for each input variable.

8. A method according to claim 4, wherein, in the memory word related to a last antecedent part of the rule, the second field takes a different meaning to indicate the presence or absence of further rules determining the fuzzy output, when the rule being processed is a last or only rule.

9. A method according to claim 2, wherein said first type of memory word further comprises a, single-bit field representing a negating NOT operator in fuzzy logics.

10. A circuit architecture for coding, processing and storing fuzzy logic rules, wherein at least one inference rule of the IF/THEN type having a predetermined number of antecedent parts of fuzzy variables and at least one consequent part are dismembered into separate antecedent parts and consequent parts, each part stored in an individual memory word to allow subsequent processing using logic operators of AND/OR/NOT type, said architecture comprising a fuzzy processor connected bi-directionally to a memory where the dismembered parts are coded for serial processing and stored sequentially in an order corresponding to a structure of the IF/THEN type inference rule and the subsequent processing of the memory words in a rule and the fuzzy logic rules are processed serially and sequentially in the order with which they are stored.

11. An architecture according to claim 10, further comprising a processing circuit portion for computing an alpha weight of an antecedent part of a fuzzy rule and an evaluation circuit block for computing and outputting an omega weight related to the antecedent part of the fuzzy rules, and a circuit portion provided downstream from the evaluation circuit block to process the various omega weights output by the evaluation circuit block, and outputting a fuzzy output, said circuit portion processing said omega weights using a Centroid Method.

12. An architecture according to claim 11, wherein said evaluation circuit block includes registers adapted to contain values of partial operations of fuzzy inference.

13. A circuit architecture for coding, processing and storing fuzzy logic rules, wherein at least one inference rule of the IF/THEN type having a predetermined number of antecedent parts of fuzzy variables and at least one consequent part are dismembered into separate antecedent parts and consequent parts, each part stored in an individual memory word to allow subsequent processing using logic operators of the AND/OR/NOT type, said architecture comprising a fuzzy processor connected bi-directionally to a memory where the memory words of the inference rule being stored sequentially in an order corresponding to a structure of the IF/THEN type inference rule and a coding of the rules and the variables is effected sequentially, wherein each rule is coded in said memory, each rule having:

a first type of memory word composition for each antecedent part; and a second type of memory word composition for each consequent part;

and said architecture further comprising a processing circuit that receives serially and sequentially in the order with which the parts are stored said individual memory words having said first composition and said individual memory words having said second composition to provide a fuzzy output.

14. A circuit architecture for coding and storing fuzzy logic rules, wherein at least one inference rule of the IF/THEN type having a predetermined number of antecedent parts of fuzzy variables and at least one consequent part are dismembered into separate antecedent parts and consequent parts, each part stored in an individual memory word to allow subsequent processing using logic operators of the AND/OR/NOT type, said architecture comprising a fuzzy processor connected bi-directionally to a memory where the memory words of the inference rule are stored sequentially in an order corresponding to a structure of the IF/THEN type inference rule, wherein each memory word for each antecedent part is divided into fields, each field including a first field defining a rule structure, a second field representing a logic operator, a third field indicating an input variable whose value is to intersect a membership function indicated in a following fourth field such that an alpha weight can be determined for the antecedent part being processed.

15. A method of coding and processing a fuzzy logic rule, said fuzzy logic rule comprising at least one antecedent part and at least one consequent part, the method comprising the steps of:

storing each of said at least one antecedent part in a separate first memory byte;

storing each of said at least one consequent part in a separate second memory byte; and serially processing each of said at least one antecedent part and each of said at least one consequent part.

16. The method of claim 15, further comprising dividing each of said first memory bytes into a plurality of fields.

17. The method of claim 16, further comprising:

storing, in a first field of each of said first memory bytes, information which indicates a priority of order followed in said processing step;

storing, in a second field of each of said first memory bytes, information which indicates a logic operation to be performed;

storing, in a third field of each of said first memory bytes, an input variable on which said logic operation is performed; and storing, in a fourth field of each of said first memory bytes, a membership function which determines a weighting factor for each antecedent part.

18. The method of claim 17, further comprising storing, in a fifth field of each of said first memory bytes, information which indicates whether a NOT operator is to be applied to the input variable stored in the third field of each memory byte.

19. The method of claim 18, further comprising storing, in said second field of a final antecedent part of said fuzzy logic rule, information which indicates the presence or absence of further rules to be processed in said processing step.

20. A device for storing and processing fuzzy logic rules, each of said fuzzy logic rules comprising at least one antecedent, each antecedent having at least one antecedent part and a corresponding consequent, $Z_i$, each consequent $Z_i$ having at least one consequent part, each of said at least one antecedent part and said at least one consequent part comprising a separate memory word and stored sequentially in an order corresponding to a structure of the fuzzy logic rule, the device comprising:

memory means for storing a plurality of said memory words;

alpha value computing means for computing an alpha value for each of said at least one antecedent parts;

omega value computing means for receiving said alpha value from said alpha value computing means and computing an omega value, $\omega_i$, for each antecedent of each fuzzy logic rule;

processing means for receiving said omega value $\omega_i$ and said consequent $Z_i$ and outputting a fuzzy output after processing said omega value and consequent according to the equation:

$$\frac{\Sigma \omega_i * Z_i}{\Sigma \omega_i} ; \text{ and}$$

wherein $\omega_i$ is a weight of the I-th fuzzy logic rule;

control means for supplying said memory words from said memory means to said alpha value computing means, for supplying said consequent $Z_i$ from said memory means to said processing means and for controlling the operation of said alpha value computing means, said omega value computing means and said processing means.

21. A method of storing and processing fuzzy logic rules, wherein at least one inference rule of the IF/THEN type having a predetermined number of antecedent parts of fuzzy variables and at least one consequent part are dismembered and stored into a plurality of memory words, a memory word for each antecedent part and another memory word for each consequent part, the plurality of memory words stored sequentially in an order corresponding to a structure of the IF/THEN type inference rule, processing using logic operators of the AND/OR/NOT type, and reconstructing the fuzzy logic rules by processing in a sequential manner one memory word sequentially followed by said another memory word.

* * * * *

UNITED STATES PATENT AND TRADEMARK OFFICE
CERTIFICATE OF CORRECTION

Figure 9A:
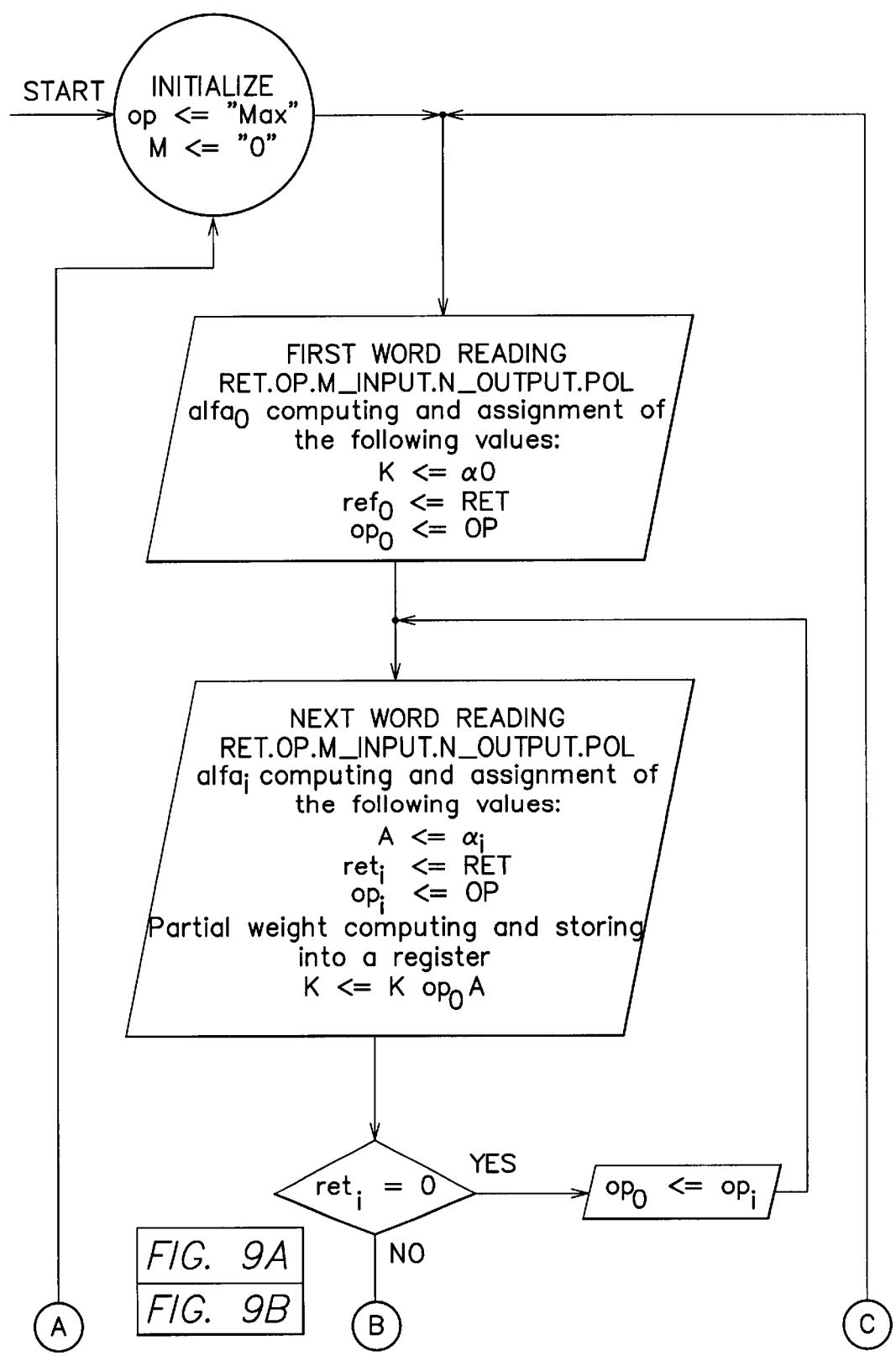
FIG. 9 is a flow diagram implementing the method of the present invention.
Figure 9B:
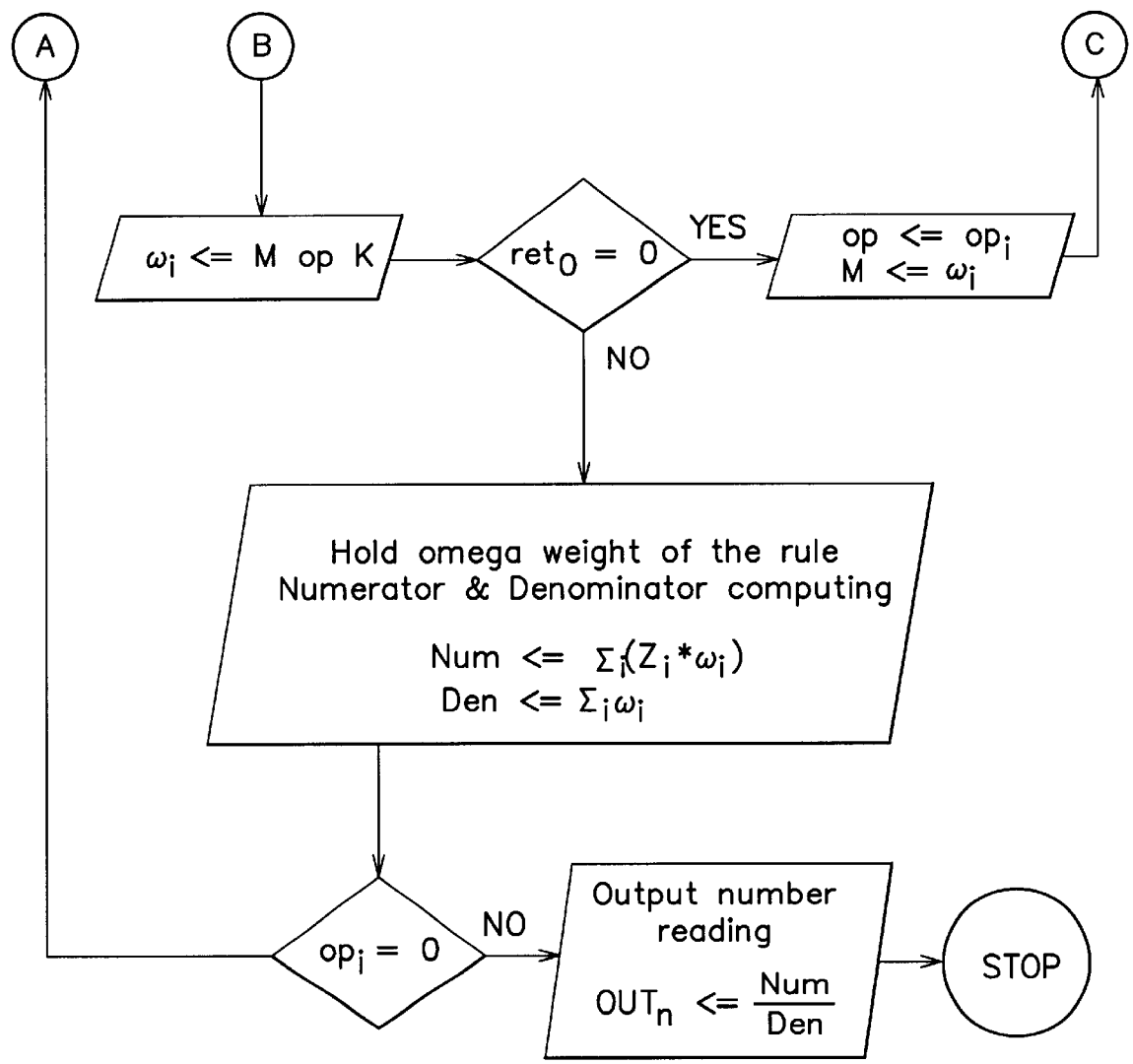

PATENT NO. : 6,424,958 B1
DATED : July 23, 2002
INVENTOR(S) : Francesco Pappalardo, Liliana Arcidiacono, Biagio Giacalone and Dario Di Bella It is certified that error appears in the above-identified patent and that said Letters Patent is hereby corrected as shown below:

Column 3,
Lines 60-61, should read -- Figs. 9A-9B illustrate a flow diagram implementing the method of the --.

Column 7,
Line 13, should read -- of Figs 9A-9B, which illustrates the various steps of processing --.

Signed and Sealed this

Twelfth Day of November, 2002

Attest:

JAMES E. ROGAN
Attesting Officer
Director of the United States Patent and Trademark Office